Dec. 4, 1923.  
J. B. HASKELL  
VALVE ACTUATING MECHANISM  
Filed Feb. 17, 1923  
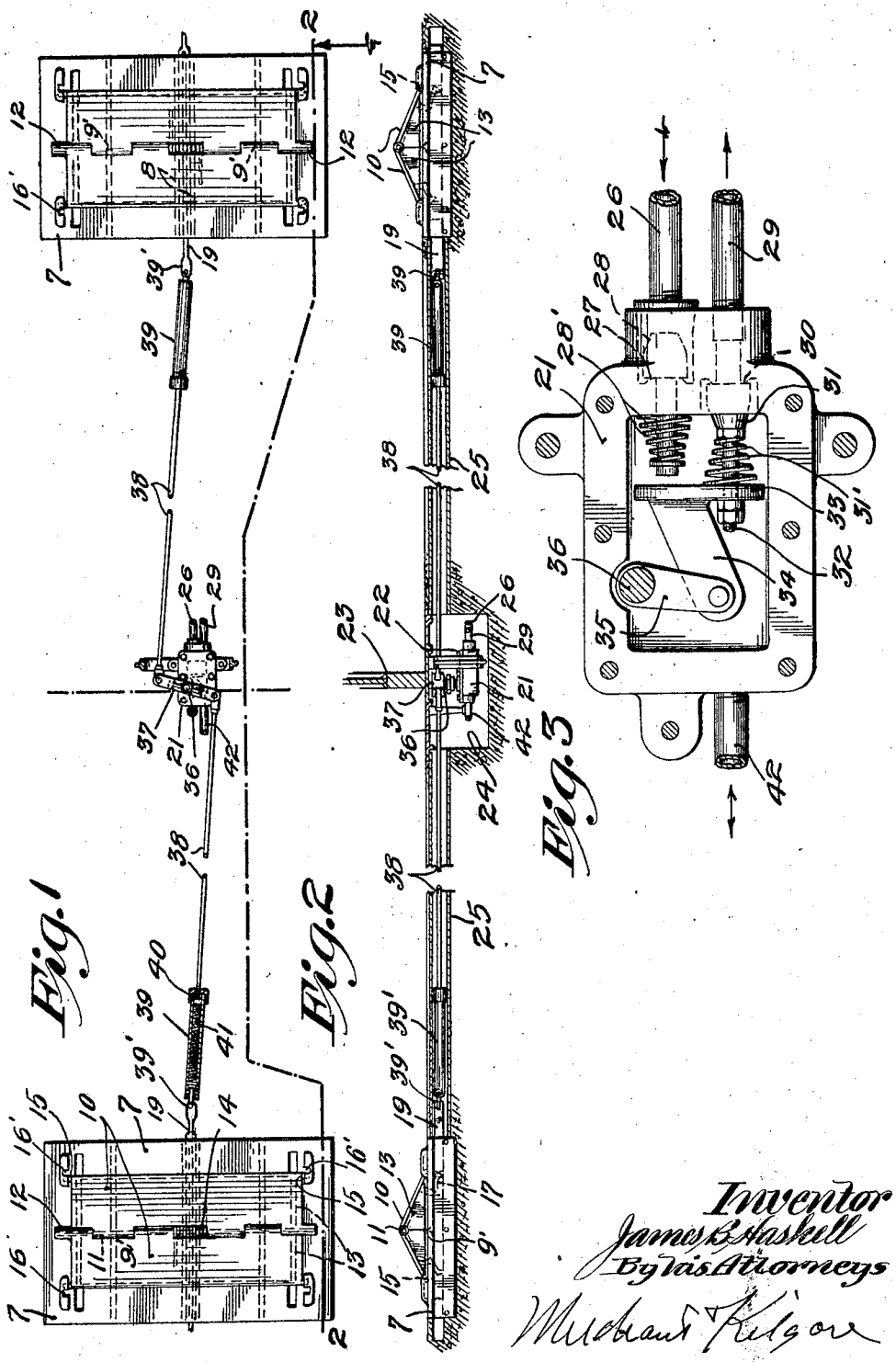

Dec. 4, 1923. 1,476,510
J. B. HASKELL
VALVE ACTUATING MECHANISM
Filed Feb. 17, 1923    2 Sheets-Sheet 2
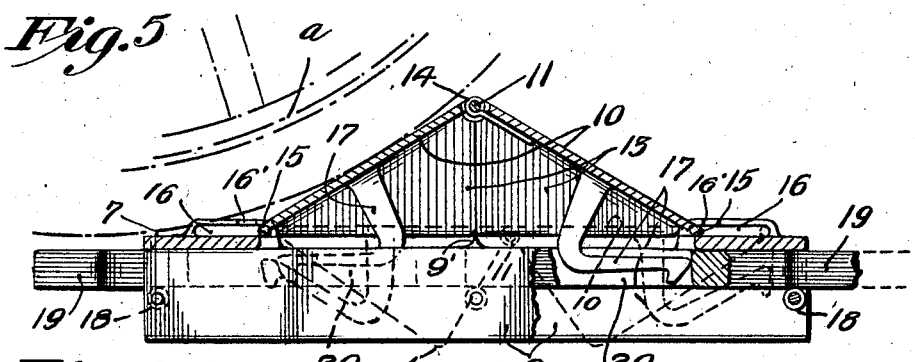
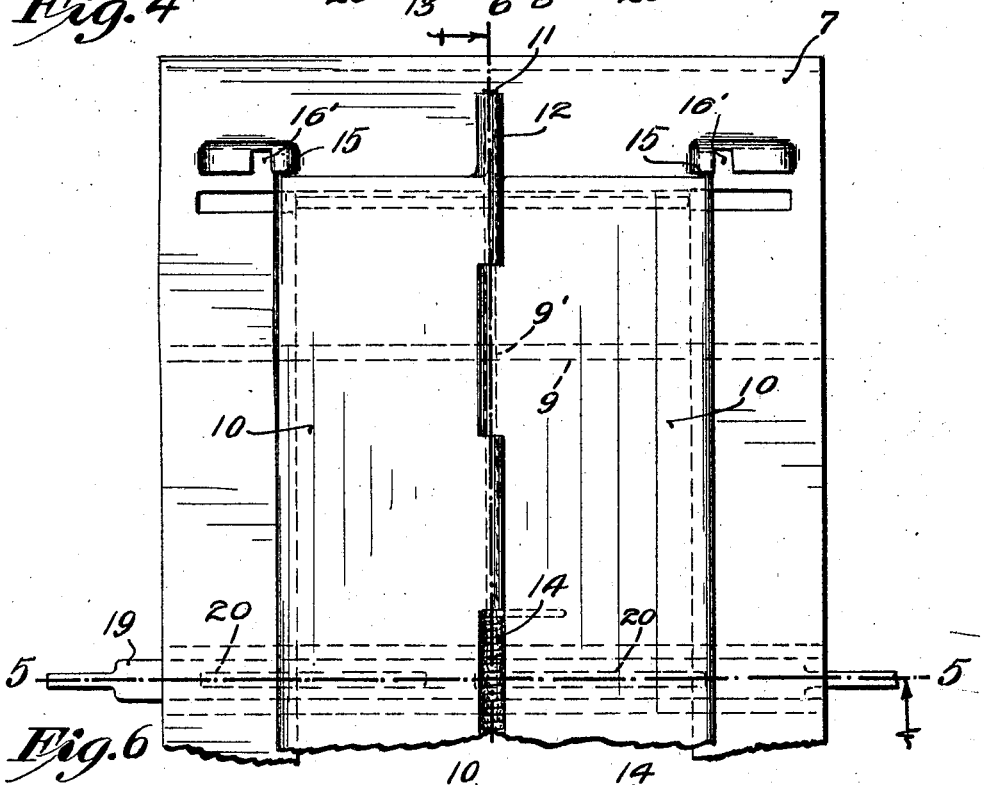
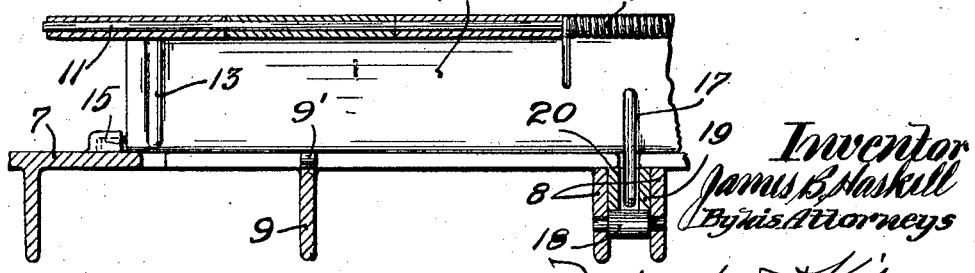

Patented Dec. 4, 1923.

1,476,510

UNITED STATES PATENT OFFICE.

JAMES B. HASKELL, OF LONGVILLE, MINNESOTA.

VALVE-ACTUATING MECHANISM.

Application filed February 17, 1923. Serial No. 619,775.

*To all whom it may concern:*

Be it known that I, JAMES B. HASKELL, a citizen of the United States, residing at Longville, in the county of Cass and State of Minnesota, have invented certain new and useful Improvements in Valve-Actuating Mechanism; and I do hereby declare the following to be a full, clear, and exact description of the invention, such as will enable others skilled in the art to which it appertains to make and use the same.

My invention relates to a vehicle-operated valve-actuated mechanism especially adapted for use in connection with automatic doors and gates that are operated by pneumatic power through a cylinder and piston motor or the like, and, generally stated, the invention consists of the novel devices and combinations of devices hereinafter described and defined in the claims.

This improved valve-actuating mechanism may be found useful for various purposes other than above indicated, but the principles involved therein will be made clear by the description thereof in its use for the purpose above indicated. For convenience, the device will hereinafter be referred to as a door-actuating mechanism, but it will, of course, be understood that a gate will be within the scope of the above expression as here used.

Garage doors, for example, have hitherto been operated by pneumatic power applied through a simple cylinder and piston motor, the piston of which has been caused to move in one direction under the action of a spring and in the other direction by the introduction of compressed air into the cylinder. My present invention does not relate to the particular type of motor nor to the connections between the motor and door. The valve mechanism for controlling the supply of compressed air to and from the motor may also take various forms, but my invention is directed particularly to an improved valve-actuating device with which the wheel of a vehicle, such as that of an automobile or motor-propelled truck, is adapted to be engaged to effect the valve movements necessary to cause the motor to properly operate the door.

In the accompanying drawings, which illustrate the invention, like characters indicate like parts throughout the several views.

Referring to the drawings:

Fig. 1 is a plan view, the floor or platform of the runway being removed, and showing my improved valve-actuating mechanism;

Fig. 2 is a vertical section taken approximately on the line 2—2 of Fig. 1;

Fig. 3 is a plan view of the valve mechanism and cooperating air chamber, the cover of the latter being removed;

Fig. 4 is a plan view with some parts broken away, showing one of the improved wheel-operated valve-actuating devices;

Fig. 5 is a section taken on the line 5—5 of Fig. 4; and

Fig. 6 is a fragmentary section taken on the line 6—6 of Fig. 4.

The wheel-operated devices, of which there are two, are located in the line of movement of the vehicle in its travel into and out of the garage. The garage door will be assumed to be located midway between the two wheel-operated devices and the right-hand wheel-operated device will be assumed to be located within the garage. Each such wheel-operated device comprises a flat rectangular frame 7, preferably a casting set approximately flush with the floor or runway and having laterally spaced pairs of depending flanges 8 and preferably also intermediate depending flanges 9. For each frame 7 there is a pair of depressible actuating plates 10 intermediately connected by a hinge pin 11 and, in line with said hinge pin, having projecting hubs 12 for a purpose which will presently appear. At their ends, the plates 10 have depending triangular webs 13, the adjacent edges of which are normally in contact, as shown in Fig. 5. Torsion springs 14, applied around the pins 11, react against the connected plates 10 and exert a force normally holding the same raised in angular position shown in Fig. 5. At the ends of their lower or outer edges, the plates 10 are provided with projecting studs or cam pins 15 that slide and work pivotally in slotted guide flanges 16 formed or secured on the frame plates 7. At their under sides, the plates 10 have depending and outwardly projecting push arms 17 rigidly secured thereto and performing important functions presently to be noted.

Arranged to slide horizontally between the guide flanges 8 and over rollers 18 applied to the latter are plunger-acting bars or slides 19 provided with slots 20 in which the push arms 17 are arranged to work, as hereinafter more fully described.

Midway between the two depressible wheel-operated devices just described is a large valve casing 21 that affords a compressed air chest and is normally closed except as hereinafter provided. The top of this valve casing 21 is afforded by a plate 22 rigidly secured in the floor or runway by any suitable means. The garage door, Fig. 2, indicated by the numeral 23, is shown as located over the plate 22 and the valve casing is shown as located in a small pit 24. This pit 24 is shown as connected to the depressed frames 10 by large metal tubes 25 set below the floor, for a purpose which will presently appear.

Compressed air from a suitable source of supply will be delivered to the interior of the valve casing 21, through an air supply pipe 26, and through a port 27 that is normally closed by a spring-pressed check valve 28 that acts as an intake valve. The numeral 29 indicates an exhaust pipe that opens from the casing 21 through a port 30 that is normally closed by a check-acting valve 31 that operates as an exhaust valve. The exhaust valve 31 has a stem 32 that works freely through a push plate 33 carried by one end of an arm 34 that is pivoted to a crank arm 35 of a rock shaft 36. The rock shaft 36 extends through and is journaled in the top plate 22 of the valve casing 21. To the upper end of the rock shaft 36 is intermediately secured a lever or double-ended arm 37. The opposite ends of this lever 37 are connected by rods 38 to the inwardly projecting ends of the two push bars or slides 19. For an important reason, the rods 38 have yielding sections interposed therein and, as shown, these yielding sections comprise tubular casings 39, plunger heads 40 and interposed coiled compression springs 41, and which tubular sections 39 are connected to the push bars or slides 19 by universal joints 39'.

The numeral 42 indicates an air pipe that extends from the air chamber of the valve casing 21 to the cylinder and piston or other form of air motor, not shown but which may operate the door 23. The slotted guide flanges 16 are provided with notches 16' that permit the cam pins 15 of the valve-actuating plates 10 to be passed therethrough to and from operative positions.

*Operation.*

The operation of the device described is substantially as follows:

The drawings show the various parts in their normal positions, in which positions the door 23 will be in a closed position. For the purposes of this case, it may be assumed that the door 23 would be moved into an open position whenever air from the supply pipe 26 is admitted to the pipe 42, which will lead to the door-operating air motor, and the said door would be closed automatically by a spring or otherwise when the pipe 42 is connected to the exhaust pipe 29.

For the first illustration, assume that an automobile is moved from the left toward the right or from the exterior toward the interior of a garage, the door 23 being normally closed, and that the front wheel of the automobile runs onto the left-hand valve-operating plates 10. By reference to Fig. 5, it will be noted that under the above movement of the automobile, its wheel *a* engages the left-hand plate 10 and exerts a pressure thereon both downward and toward the right, which prevents the left-hand plate from slipping toward the left and causes the two hinge plates to move into a horizontal position, under which movement the right-hand plate is slid toward the right, thereby causing its arm 17 to force the left-hand slide 19 toward the right. This movement of the slide 19 toward the right, acting through the left-hand connecting rod 38, rocks the lever 37 and moves the push plate 33 toward the right in respect to Fig. 3. This movement of said push plate toward the right compresses the spring 31' and simply presses the exhaust valve 31 tighter to its seat, but it compresses the spring 28' and forces the air inlet valve 28 into an open position, thereby permitting the compressed air to flow from the pipe 26 through the valve casing and pipe 42 to the door-actuating motor, and this, as already assumed, will cause the garage door to be opened so that the automobile may be freely moved into the garage.

When the two plates 10 are depressed by the automobile wheel, as just described, the projecting hubs 12 will be forced down just to the right of substantially V-shaped retaining lugs 9', shown as formed on certain of the flanges 9, and this positively prevents the two depressed plates 10 from sliding toward the left as long as they are held down in their depressed horizontal positions. As soon as the wheel is passed over the said depressed plates 10, they will be automatically restored to their raised neutral positions shown in Fig. 5, under the action of the springs 14. The springs 28' and 31' of the valves 28 and 31 are of such light tension that they simply tend to hold said valves closed but are not strong enough to move the push plate 33, lever 37 and slides 19 and, hence, when the push plate 33 is moved toward the right so as to compress the spring 28' and open the inlet valve 28, said valve 28 will remain open until the push plate is moved toward the left by the action of a wheel on one of the wheel trips made up of the depressible plates 10. The said valves will remain either in open or closed positions until the push plate 33 is moved in the one direction or the other by the action of the wheel.

When the automobile passes into a garage and one of its front wheels runs against the left-hand plate of the second or right-hand valve-actuating device, the two right-hand plates will be depressed with a downward and sliding movement toward the right, which, acting through the right-hand connecting rod 38, rocks the lever 37 in a direction reverse from that imparted thereto under the action previously described, and this will move the push plate 33 toward the left. When the said push plate 33 is thus moved toward the left, it positively opens the exhaust valve 30, thus permitting air to escape from the door-actuating air motor and permitting the door to be closed.

When the automobile is run from the right toward the left or out of the garage, the actions above described will take place in the same order but from a reverse direction, and the door will first be opened and later closed. Under the above described movements, the front and rear wheels will run over certain of the depressible plates 10 and impart thereto a second depression, but such second depressions will not be effective because the operations that they attempt to perform will have already been performed.

As another illustration, assume that the car entering the garage has turned in sharply from the street and that the rear wheel misses the plate nearest the street but strikes at an angle on the inside or opposite plate of the outer wheel trip. In this case, if it were not for the hubs 26, the door-operating action would be prematurely reversed, but with the projecting hubs 12, the latter, by engagement with the fixed lugs 9, prevents such untimely reversed action.

The yielding connections in the rods 38 permit the same to shorten up rather than bend or break, if, at any time, both pairs of actuating plates should be simultaneously depressed under conditions tending to put both rods, simultaneously, one under tension and the other under compression.

What I claim is:

1. A vehicle-operated actuating mechanism of the kind described comprising a pair of connected actuating plates normally held raised in reversely inclined positions but arranged to be depressed and to be slid in either of two directions according to the direction of travel of the vehicle wheel, and an actuating connection arranged to be moved from an intermediate position in the one direction or the other according to the direction in which the depressed plates are slid from normal.

2. A vehicle-operated actuating mechanism of the kind described comprising a pair of connected actuating plates normally held raised in reversely inclined positions but arranged to be depressed and to be slid in either of two directions according to the direction of travel of the vehicle wheel, an actuating slide underlying said actuating plates, and projections on said actuating plates operative on said slide to move the same in the one direction or the other, depending on the direction in which said actuating plates are slid when depressed.

3. The structure defined in claim 1 in further combination with a fixed stop and a cooperating projection carried by said plates and engageable with said stop on the one side or the other when said plates are depressed, to prevent backsliding movement while the plates are depressed.

4. A device of the kind described comprising intermediately hinged actuating plates mounted at their lower edges for angular and sliding movements, yielding means normally holding said plates in angular raised intermediate positions, a slide extending in the general direction of the sliding movement of said plates, and projections on said plates operative to move said slide in the one direction or the other according to the direction in which said plates are slid when depressed.

5. The structure defined in claim 2 in further combination with means for holding the said plates against sliding movements when depressed.

6. An actuating mechanism of the kind described comprising a pair of hinge-actuating plates having lateral projections at their outer edges, horizontal guides cooperating with said projections to guide said plates for sliding movements when depressed, springs acting on said plates to normally hold the same in angular raised intermediate positions, a slide mounted below said plates, arms depending from said plates and operative on said slide to move the same in the one direction or the other according to the direction in which said plates are slid when depressed.

In testimony whereof I affix my signature.

JAMES B. HASKELL.